United States Patent [19]

Faris et al.

[11] 3,996,653

[45] Dec. 14, 1976

[54] METHOD OF RECONDITIONING UNDER-ROLLER TYPE WIRE STRANDERS

[75] Inventors: Charles George Faris; John Gilbert Wynne, both of Sedalia, Mo.

[73] Assignee: Swiss Aluminium Limited, Chippis, Switzerland

[22] Filed: July 10, 1975

[21] Appl. No.: 594,622

[52] U.S. Cl. .......................... 29/401 B; 29/401 R; 29/DIG. 26; 57/58.34; 57/103; 140/149; 74/214

[51] Int. Cl.[2] .......................................... B23P 7/00

[58] Field of Search ......... 29/401 R, 401 B, 401 E, 29/401 F, 148.4 A, DIG. 26; 57/58.34, 103; 140/149; 74/214, 215, 230.7, 229

[56] References Cited

UNITED STATES PATENTS

| | | | |
|---|---|---|---|
| 826,288 | 7/1906 | Tilgner | 74/214 |
| 1,423,776 | 7/1922 | Morrison | 57/58.34 |
| 2,164,630 | 7/1939 | Somerville | 57/58.34 |
| 2,425,188 | 8/1947 | Honigman | 74/214 |
| 3,739,892 | 6/1973 | Liberty, Jr. | 29/401 |

Primary Examiner—C.W. Lanham
Assistant Examiner—Dan C. Crane
Attorney, Agent, or Firm—David A. Jackson; Robert H. Bachman

[57] ABSTRACT

A method of reconditioning tubular, multi-bobbin wire stranders employing under-roller supports in contact with radially protruding load bearing surfaces which comprises reducing the circumference of said surfaces while machining said surfaces to within 0.001 inch tolerance, providing said supports with an increased roller circumference and machining said circumference to within 0.001 inch tolerance, and placing said supports in fixed position to said surfaces whereby said supports are leveled to within 0.002 inch per foot of the centerline of said strander. The above method reduces the incidence of maintenance and can reduce the noise generated by the stranger by as much as 15 dBA.

9 Claims, 3 Drawing Figures

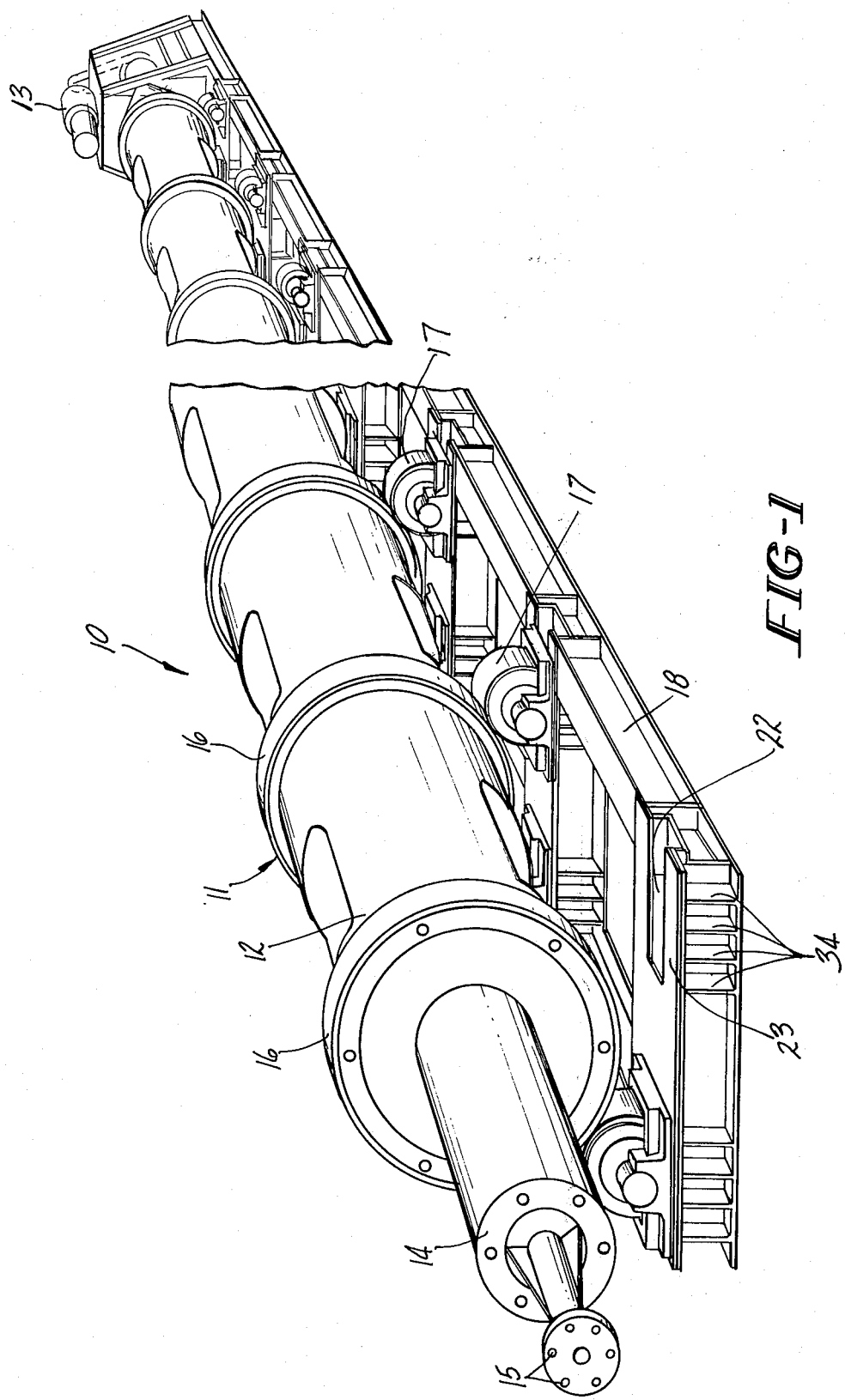

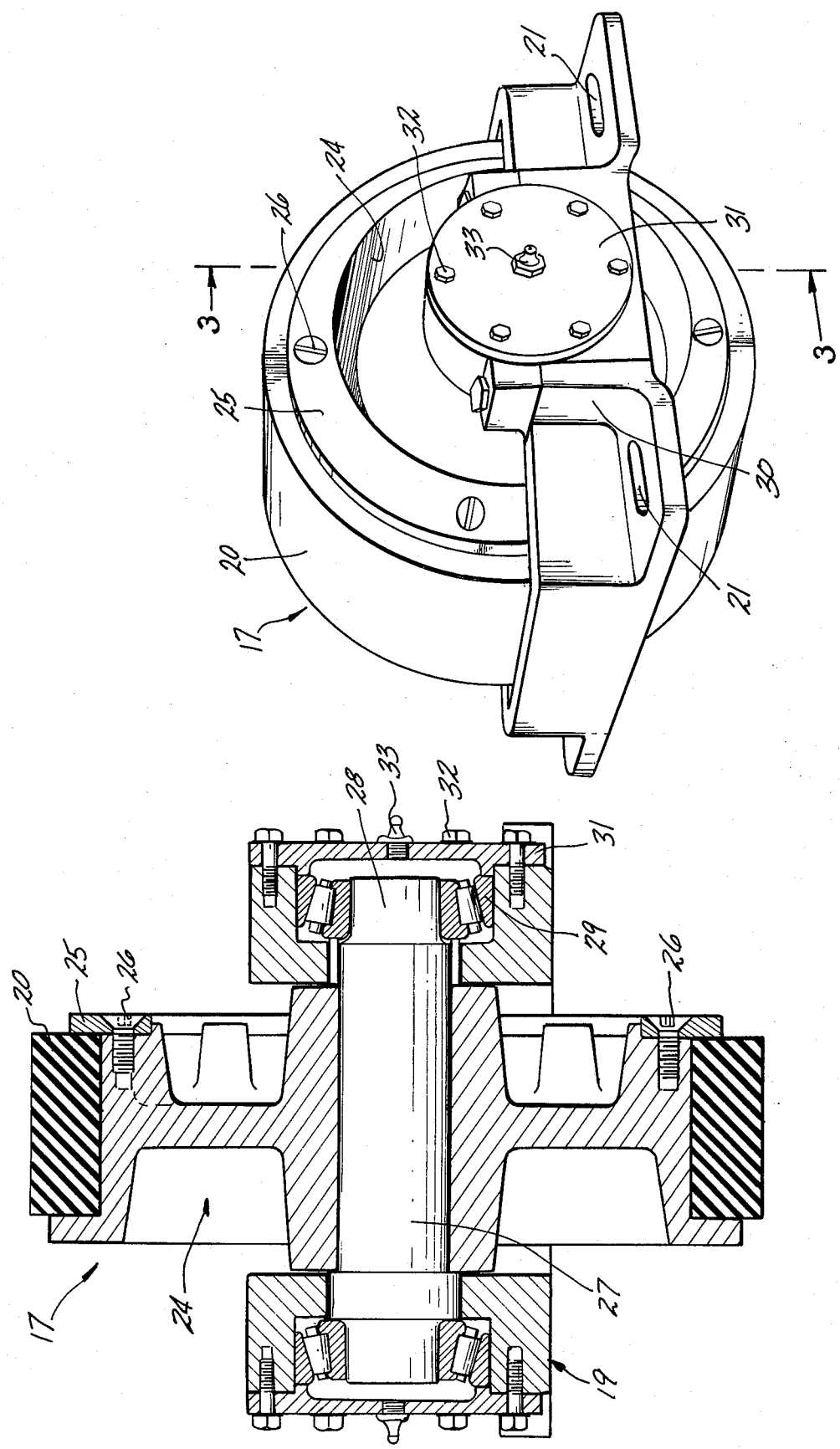

METHOD OF RECONDITIONING UNDER-ROLLER TYPE WIRE STRANDERS

BACKGROUND OF THE INVENTION

The present invention relates to the maintenance and reconditioning of under-roller type wire stranders, and particularly deals with the reconditioning of the associated support roller assemblies.

Historically, under-roller type wire stranders which are employed to manufacture multi-stranded wire cable have required significant amounts of maintenance after having been in operation for relatively short periods of time. The primary maintenance work has been found to result from the failure of the support rollers and their bearings. The support rollers employed in these stranders generally possess an outer circumferential support surface prepared from a synthetic resinous material, generically referred to as phenolic. Due to the fact that the rollers continuously support the rotating strander assembly, the weight of the assembly combines with the frictional force of contact to shorten the useful life of the phenolic. When this type of failure occurs, the machine must be shut down in order to replace the phenolic material on the rollers. Further, as the machine ages, the frequency of breakdown increases geometrically, with the result that the practice which has developed in the industry dictates that the operation of the strander be maintained at a uniform, reduced speed.

The above noted difficulties bear significantly on the profitability of machine utilization and product cost. Naturally, this problem has been approached in the past, however, with no significant success.

SUMMARY OF THE INVENTION

In accordance with the present invention, a procedure for reconditioning and continued maintenance of under-roller type wire stranders has been developed.

The method of the present invention comprises machining the load bearing surfaces of the strander assembly to within 0.001 inch tolerance of roundness with respect to the centerline of said strander while reducing the circumference of said surfaces, providing the support rollers located in fixed position on a base resting below said strander assembly with an increased circumference which has been machined to within 0.001 inch tolerance of roundness, modifying the housings of said rollers and the points of attachment of said housings to said base to enable said housings to slidably engage said base for ease in adjustment and removal of said rollers during the operation of said strander, and attaching said housings containing said rollers to said base whereby said rollers are leveled to within 0.002 inch per foot of the centerline of said assembly.

The above method enables the operation of the strander at sustained high speeds with reduced frequency of repair. Moreover, the attention to the aforenoted tolerances of roundness, and alignment of the assembly and the rollers with each other likewise reduces machine failure. In addition to the procedures outlined above, the method further contemplates the reestablishment of the centerline of the tubular bobbin assembly and the adjustment of the alignment with each other of the various sections comprising said assembly. This procedure diminishes or totally eliminates such problems as mismatch of the centerlines of each component with that of the total assembled unit, and the resulting "whipping" action which may be observed in the rotation of the strander assembly.

It is a principal object of the present invention to provide a method for the reconditioning of an under-roller type tubular wire strander.

It is a further object of the present invention to provide a method as aforesaid which results in reduced maintenance of said strander under increased speeds of operation.

It is a yet further object of the present invention to provide a method as aforesaid which reduces repair and maintenance costs while facilitating reduced costs of product production.

It is a still further object of the present invention to provide a method as aforesaid which enables the improved maintenance of said strander without significant redesign of its components.

Further objects and advantages will be readily apparent to those skilled in the art from a consideration of the detailed description which follows with reference to the following drawings.

BRIEF DESCRIPTION OF THE DRAWINGS

FIG. 1 is a perspective view of an under-roller type strander in accordance with the invention.

FIG. 2 is a perspective view of a support roller prepared in accordance with the invention.

FIG. 3 is a sectional view of the roller of FIG. 2 taken through line 2—2.

DETAILED DESCRIPTION

In accordance with the present invention the foregoing objects and advantages are readily obtained. The method of the present invention relates to the reconditioning of under-roller type, multi-bobbin wire stranders. A typical strander representing the type employed in accordance with the present invention is illustrated in perspective in FIG. 1. Thus, strander 10 comprises an extended tubular bobbin housing assembly 11 comprising a series of bobbin housings 12 connected in end-to-end relationship. Rotational power is provided at one end thereof by a power source 13 comprising a motor or the like. At the end opposite said power source 13, a nose portion 14 is mounted in alignment with the axial centerline of housing 12. During the operation of strander 10, wire located in the bobbins passes through the openings 15 of nose portion 14 and is thereafter wound into co-axial relationship to form a cable structure.

Referring again to FIG. 1, bobbin housing assembly 11 is provided with radially protruding load bearing surfaces 16 located at the junctions of the respective bobbin housings 12 as well as at the respective ends of the assembly 11. Bearing surfaces 16 are adapted to communicate with support rollers 17 located beneath assembly 11 in fixed attachment with longitudinally extended base 18. Thus, during the rotation of assembly 11, bearing surfaces 16 travel upon the surfaces defined by the outer circumferences of rollers 17. It is this mechanism which maintains assembly 11 in alignment during the operation of strander 10 by facilitating the rotation of assembly 11 upon a single longitudinal axis. Generally, the load bearing surfaces 16 are prepared from steel, however, other equivalent materials may be employed. Surfaces 16 may be a part of a detachable ring which can be individually serviced during reconditioning, or may comprise an integral part of bobbin housing 12 which is stationary thereon. The method of the present invention is adaptable to either eventuality, as detachable surfaces 16 can either be replaced or refinished, and those which are fixed in position may be refinished while attached to the bobbin housing 12.

As noted earlier, the primary difficulty encountered in the maintenance of stranders such as that illustrated in FIG. 1 resides in the breakdown of the support rollers 17. Referring now to FIG. 2, support roller 17, shown in more detail, comprises a cylindrical structure supported on either side through its central axis by roller housing 19 which contains a pair of bearings, not shown in this figure, which permit the roller to rotate freely upon its axis. Roller 17 possesses a cylindrical ring 20 of synthetic resinous material, referred to earlier by the generic term phenolic. This term can be considered to include that class of synthetic resinous materials which display a high temperature and abrasion resistance, and which are particularly suited to the friction and heat encountered in the operation of the strander. Generally, such materials comprise thermosetting resins employing a phenolic structure as part of the polymer material.

Continuing with FIG. 2, roller housing 19 is provided with screw holes 21 for the attachment to base 18. In accordance with the present invention and referring once again to FIG. 1, it can be seen that roller housing 19 is adapted for slidable communication with base 18 for improved ease of installation and adjustment. Specifically, base 18 is provided with a rectangular depression or trough 22 which is deep enough to accept roller 17. Naturally, the surrounding support 23 located adjacent trough 22 is provided with the appropriate screw holes, not shown, to facilitate the anchoring of roller 17 in fixed relationship to bearing surfaces 16 of the bobbin housing assembly 11. The exact nature of the refitting of roller 17 into roller housing 19 and the provision of trough 22 will be discussed in greater detail hereinbelow.

Turning now to FIG. 3, the roller 17 of FIG. 2 is shown in vertical cross-section. Ring 20 is mounted up on wheel 24 and is held in place by a circular lateral retainer 25 which is fastened to wheel 24 by flat-head screws 26. Wheel 24 is mounted upon axle 27 which is reduced in diameter at its ends to define bearing journals 28. Bearing journals 28 are fitted with tapered bearing assembly 29 which is supported within a specially configured portion of roller housing 19 comprising a one-piece subplate 30 which has been line bored to accept the outer races of bearing assembly 29 and which is provided with a removable facing 31 including hex bolt fasteners 32 and a grease fitting 33.

The above discussion relating to roller 17 and FIGS. 2–3 is illustrative of the modification of the roller housing and bearing assembly to improve operation and reduce repair. A full description of the reconditioning method of this invention follows below.

As stated above, the method of the present invention involves, in its primary aspects, the resurfacing and refitting of the load bearing surfaces 16 and the support rollers 17. Thus, referring once more to FIG. 1, strander 10 is disassembled by the dismantling of bobbin housing assembly 11 and its removal from base 18. Bobbin housing assembly 11 is then separated into respective bobbins 12, and the bearing surfaces 16 are resurfaced by machining. As noted earlier, bearing surfaces 16 may be integral with bobbin housing 12 or separable therefrom. In either instance, resurfacing is easily carried out by turning on a lathe using a blunt nose lathe bit or by grinding. Resurfacing is conducted to reduce the circumference of bearing surfaces 16 and, more importantly, to ensure constant loading on the support rollers 17 during the operation of the strander and provide a smooth, square surface to reduce sliding friction in the loadline due to the variation in speeds of bearing surfaces 16 and rollers 17.

Resurfacing is conducted to within rigid ranges of tolerance of roundness. This tolerance as defined herein is expressed in total indicator readings (T.I.R.) and measures the maximum radial deviation, in inches, that the circumference can possess as determined with reference to the axial center of the structure. This standard of measurement is employed with both bearing surfaces 16 and rollers 17. Thus, bearing surfaces 16 must be resurfaced to within 0.001 inch T.I.R., and preferably from within about 0.0005 inch to 0.001 inch. Such an exacting standard of roundness contributes significantly to the unexpectedly improved levels of uninterrupted performance which characterize the present invention.

After the resurfacing of the bearing surfaces 16 is completed, the support rollers 17 are removed from base 18. Rollers 17 are then dismantled and fitted with rings 20 of increased diameter which will reduce their rotation and speed in the strander, with the result that the life expectancies of the bearing assemblies 29 increase. Also, the increased diameter reduces the load cycle rate which has been observed to cause failure of the rollers due to burning. The installation of the increased diameter rings is readily apparent from FIG. 3.

The aforenoted technique is applicable when roller 17 is of modular construction. In the case where monolithic rollers are employed, the entire unit would be replaced. Both of the foregoing procedures are contemplated within the scope of the invention.

After rings 20 are installed, rollers 17 are then turned or ground in the same manner as with bearing surfaces 16 to assure their continuous contact with surfaces 16 in operation. To achieve such uniformity, the rollers should be machined to a maximum tolerance of 0.001 inch T.I.R., as measured with reference to bearing journals 28. This accuracy, likewise, enables rollers 17 to carry their full share of the weight of bobbin housing assembly 11.

Upon the completion of machining, rollers 17 are fitted into roller housing 19 in the manner discussed earlier with reference to FIGS. 2 and 3, and provided with improved bearing assemblies 29. The fully assembled rollers are then ready for reassembly with base 18.

Before reassembly can begin, the base 18 of the strander must be modified to accept the larger diameter rollers 17. Referring again to the figures, provision must be made for fastening roller housing 19 to base 18. In this connection, it should be noted that some stranders have the rollers fastened to light beams and attached to cantilevered webs of such beams. In this event, strengthening is required since any flexing of these members due to stresses arising from operating conditions severely affects the alignment of the strander. Thus, as illustrated in FIG. 1, strengthening gussets 34, and roller assembly mounting supports 23, are added to base 18 to support rollers 17.

Prior to the reassembly of the bobbin housings 12 comprising bobbin housing assembly 11, all paint and dirt must be thoroughly removed from mating surfaces since any foreign material in the joints between the bobbins will magnify, over the length of the machine, mismatch of the individual bobbin housings' centerline and the intended bobbin housing assembly centerline. All such mating faces must also have all burrs and nicks removed for the same reasons as previously stated.

The intended horizontal centerline is now established and all rollers 17 are mounted and leveled to within 0.002 inch per foot in their theoretical position on base 18. The centerline comprises in essence the axis of rotation of bobbin housing assembly 11 and can be determined by, for example, setting a pair of wires, above base 18 such that the first or lower wire is about 2 inches above the base, while the second wire is from 7–8 feet above the first and directly over it. The centerline can also be set by use of an alignment telescope or other tools of that type,. The bobbin housings 12 are then assembled on the rollers 17. During the assembly, care must be taken to ensure that the centerline of each bobbin housing matches those of bobbin housings joined to it to within 0.002 inch and that the intended centerline is followed both in a horizontal and vertical plane.

After the strander is completely assembled, the roller position is checked by running a piece of plain paper, with carbon paper, through the contact line of the roller 17 and load bearing surface 16. This is accomplished by slowly rolling the unit, allowing the paper to pass between the contacting members. By inspecting each resulting carbon impression, correction of roller position can be made to ensure uniform pressure across the face of each roller. By comparing all impressions made from each of rollers 17 minute adjustments can be made to balance loading equally over all support rollers. The darker the carbon impression the greater the load carried by the roller.

Stranders reconditioned by the process of the present invention exhibit several distinct advantages of operation, among them, reduced maintenance costs ranging up to 85%, reduced noise levels of up to 15 dBA, and minimized disturbance of machine alignment in the event of failure after repairs.

An additional noise reducing procedure associated with the maintenance of the wire stranders of this invention comprises the provision of a plurality of interconnected, noise insulating composite panels as an acoustical shroud. A first group of the panels comprise a polyurethane sandwich with perforated steel mesh on one side and solid sheet steel on the other. Such panels extend vertically upward from the floor. A second group of panels is prepared in similar fashion with the provision of a lead loaded vinyl resin sheet between the urethane and the solid steel layers. These panels possess an arcuate cross-sectional shape, and rest above to cover bobbin housing assembly 12.

The above shroud is supported on the existing framework that conventionally surrounds the wire assembly. Said framework must be modified somewhat, however, to accept the panels effectively. Finally, in addition to the shroud placed over the strander, the floor beneath the strander is provided with medium nap carpeting having a foam backing to absorb sound directed thereto.

Though the foregoing disclosure has dealt primarily with a strander of particular design, the invention is not limited thereto as the procedures outlined above generally apply to other comparable wire stranders.

It is to be understood that this invention is not limited to the illustrations described and shown herein, which are deemed to be merely illustrative of the best modes of carrying out the invention, and which are suitable of modification of form, size, arrangement of parts and details of operation. This invention is rather intended to encompass all such modifications which are within its spirit and scope as defined by the claims.

What is claimed is:

1. A method of reconditioning an under-roller type strander which comprises a tubular bobbin assembly rotatably mounted to communicate along radially protruding load bearing surfaces with a plurality of support rollers, said support rollers maintained in fixed position on a horizontally extended planar base, said method comprising:
    machining said load bearing surfaces to within 0.001 inch tolerance of roundness to maintain said surfaces in smooth parallel relationship to the longitudinal axis of rotation of said bobbin assembly and to reduce the circumference of said surfaces;
    detaching said support rollers from said base and providing said support rollers with an increased circumference and machining said rollers to within 0.001 inch tolerance of roundness;
    modifying the housing of said rollers and the points of attachment of said housing to said base located along said base, to enable said housing to slidably engage said base for ease in the adjustment and removal of said rollers during the maintenance of said strander by providing the base with a plurality of troughs which extend laterally perpendicular to the direction of the strander axis;
    slidably positioning the housing of said rollers and support rollers within the trough;
    adjusting said rollers within the trough whereby said rollers are leveled to within 0.002 inch per foot of the intended horizontally extending centerline of said assembly.

2. The method of claim 1 wherein said support rollers are machined to within 0.0005 inch to 0.001 inch tolerance of roundness.

3. The method of claim 1 wherein said machining comprises a grinding operation.

4. The method of claim 1 wherein said machining is conducted by turning on a lathe with a blunt nose lathe bit.

5. The method of claim 1 wherein said centerline is determined prior to the reassembly of said rollers and said base.

6. The method of claim 1 wherein before said machining step, said bobbin assembly is dismantled into individual bobbin housings, each bearing one or more load bearing surfaces.

7. The method of claim 6 wherein after said reassembling step, said bobbin housings are individually and sequentially aligned and assembled in contact with said rollers.

8. The method of claim 7 wherein before said bobbin housings are assembled, all mating surfaces are thoroughly cleaned to remove all surface coatings.

9. The method of claim 7 wherein after said bobbin housings are assembled, the alignment of said bearing surfaces with said rollers is checked by taking a carbon paper impression on a slip of paper passed therebetween.

* * * * *